United States Patent [19]

Franklin

[11] 4,366,972
[45] Jan. 4, 1983

[54] PIPE COATING SYSTEM

[75] Inventor: M. James Franklin, Hacienda Heights, Calif.

[73] Assignee: Ameron-Price Company, Fontana, Calif.

[21] Appl. No.: 250,207

[22] Filed: Apr. 2, 1981

[51] Int. Cl.³ .................. B29C 27/28; F16L 57/00
[52] U.S. Cl. .................................. 285/55; 29/460; 156/244.15; 285/286; 285/293
[58] Field of Search ............... 156/244.13, 244.15, 156/158; 285/55, 293, 286; 29/460

[56] References Cited
U.S. PATENT DOCUMENTS
2,924,546 2/1960 Shaw ........................... 285/293 X Primary Examiner—Evan K. Lawrence
Attorney, Agent, or Firm—Vernon D. Beehler

[57] ABSTRACT

A seamless coating system especially applicable to a welded bell and spigot type joint for steel pipe of exceptionally great length and diameter features a double layer of coating material applied to the outside surface of the pipe and extending over the joint. Use is made of a filler bridge of substantially solid elastomeric material which, though yieldable when covered with the coating material and compressed, yields only to a limited degree. The bridge is made slightly thicker than the thickness of the pipe wall so that when the bridge is applied against a sharp corner at the joint, the bridge material extends above the corner both before and after two successive layers of coating material are applied to the exterior of the pipe wall and the joint. The composition of the bridge is such that it does not compress sufficiently to expose the sharp corner under loads imposed during fabrication of the system and during handling, storage, and shipment of the system, thereby to avoid having the corner create a thin condition in the coating material where it extends over the joint and impair the integrity of the coating.

11 Claims, 11 Drawing Figures

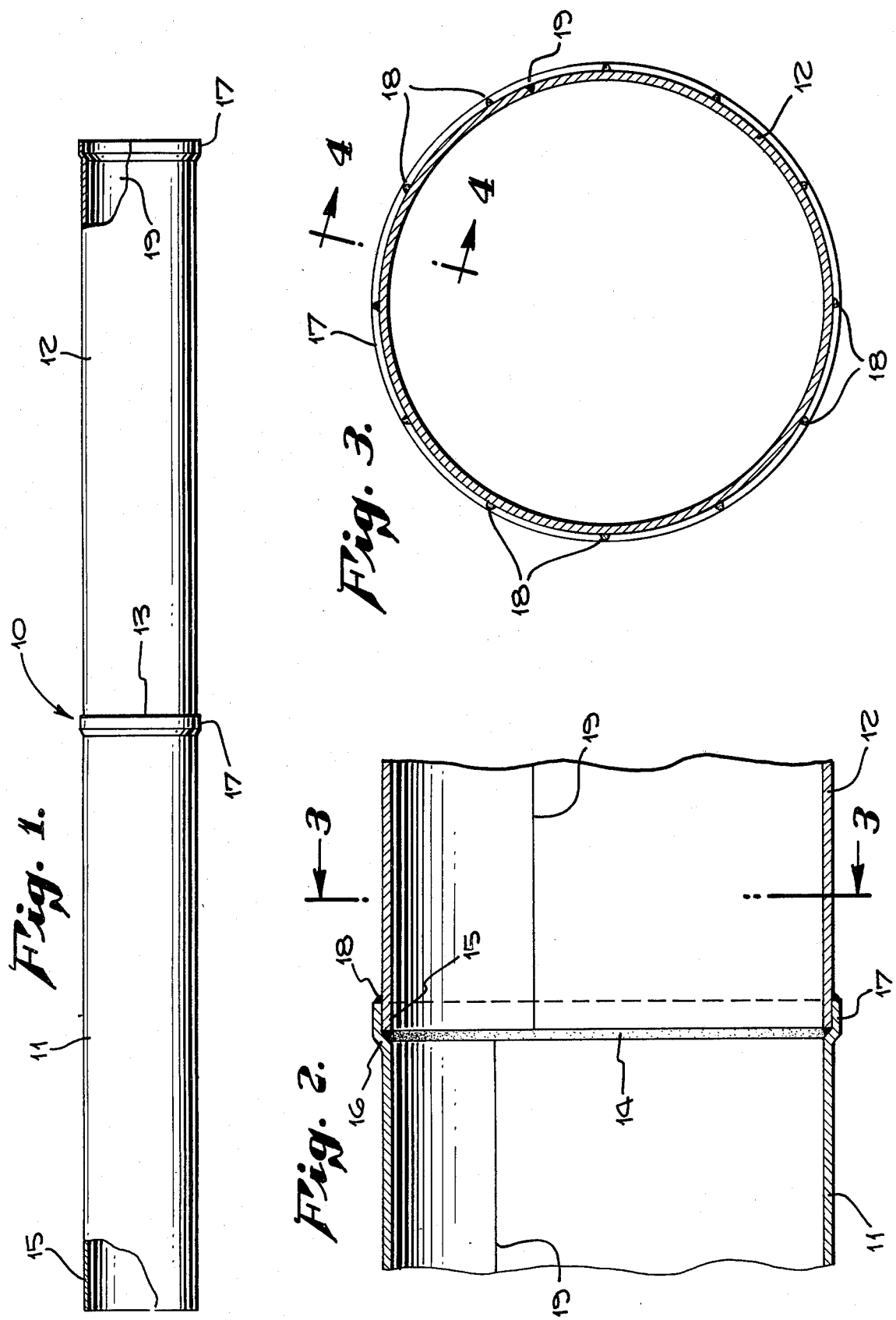

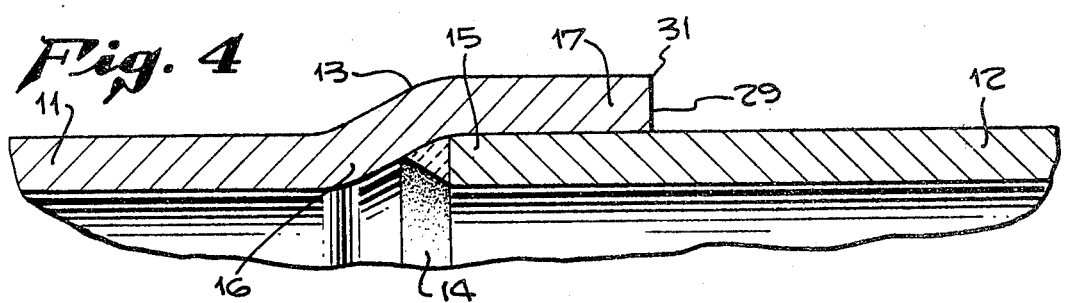
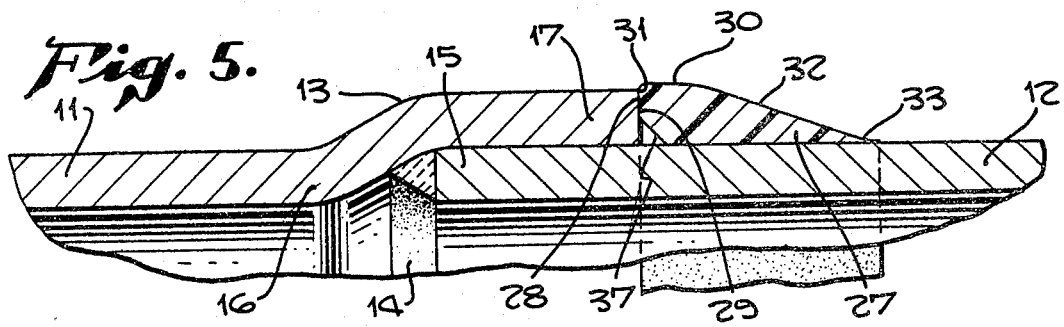
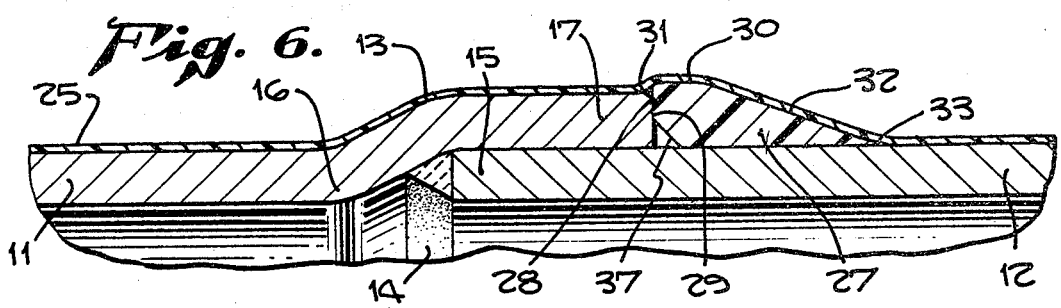
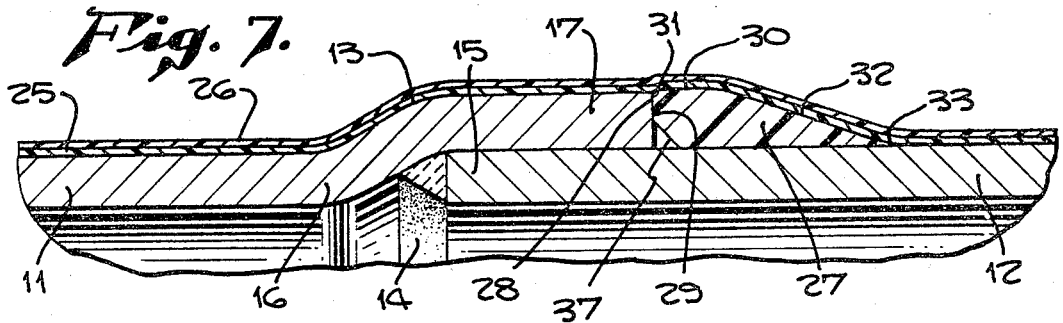
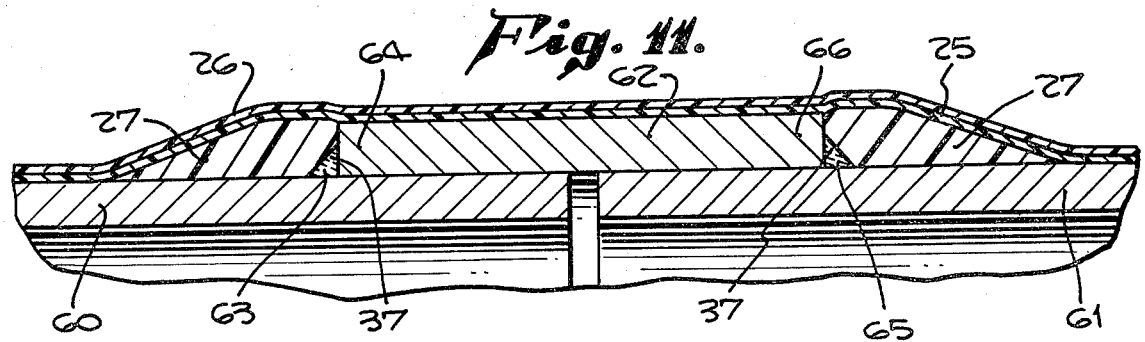

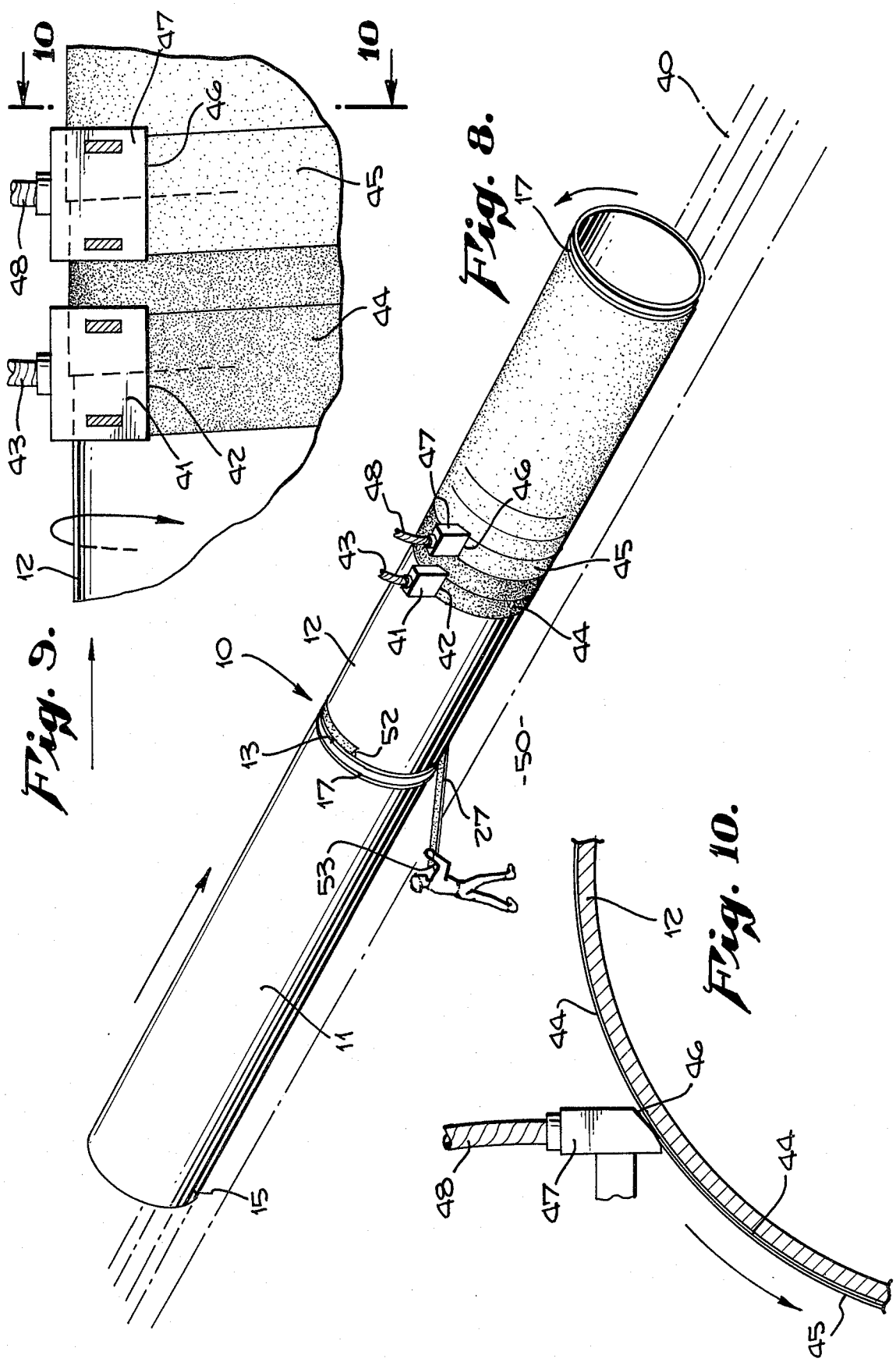

PIPE COATING SYSTEM

In the business of stocking and supplying coated steel pipe of relatively large diameter, a common practice is to make up composite multiple units of steel pipe consisting of bell and spigot pipe lengths, two of which are joined together and ultimately coated. This practice, although not specifically limited to pipes of any particular diameter, is especially adapted to bell and spigot pipe of diameter sufficiently large that a workman stationed on the interior of the pipe is able to make a three hundred sixty degree sealing weld on the interior of the bell and spigot joint. Tack welds spaced circumferentially around the exterior of the bell and spigot joint assist in strengthening the joint. One or more coatings are then applied to the exterior of both the pipe length and the joint for protection of the unit while it is being stored and also when once laid on the site. There is already in use machinery for applying successive layers of coating.

Once the welding operations have been completed, the common practice is to place such jointed dual units on a proper conveyor which moves the jointed dual unit endwise and at the same time rotates the jointed dual unit so that, in effect, a point on the exterior travels a spiral path. While the joined dual unit is travelling through the system, a common practice is to extrude and apply one spiral overlapping underlayer of tacky adhesive material such as butylmastic to the exterior of the pipe, followed by extruding a layer of polyethylene, polypropylene or similar material whereby to apply a thin film of such material in a spiral overlapping path superimposed over the butylmastic, both applications extending for the entire length of the jointed units from one end to the other.

Such jointed steel units, both before and after being coated, are customarily handled by fork lifts an appreciable number of times between the time when the unit is first made up until it is shipped to the job site as a jointed dual completely coated unit.

It can readily be understood that handling of a work product of this kind exemplified by two bell and spigot lengths of steel pipe eight feet or more in diameter and forty feet long requires for the handling power equipment such as a fork lift of considerable capacity, capable of traveling over relatively great areas where such jointed dual units can be inventoried.

Once such jointed dual units are installed in a pipe line and covered over, as is customarily the case, the condition of the coating is no longer a matter of concern. On the other hand, during the period of the making up of the units, the application of coating and then the repeated handling of the units to place them in storage and ultimately withdraw them from storage in a condition for shipment, subjects such units to some rather substantial handling problems. Clearly, every time a coated unit is handled during fabrication and storage, there remains the prospect of damaging the coating before it is ultimately delivered to the site where it will be laid. A dual jointed unit of the type described can, of course, fall off a forklift under circumstances where the coating could be readily gouged when striking hard objects on the ground. When there is prospect of damage, handling costs are high and there is the constant liability factor which must be coped with. Should the coating, moreover, be damaged during storage, a reworking job may become necessary which also adds to the overall cost.

The greatest difficulty in application of the coating is encountered at the bell and spigot joint. At that point the smooth continuity of the exterior surface varies and it becomes difficult to be certain that the thicknesses of the coating over the joint and it's freedom from imperfection will be uniformly the same as it is throughout the rest of the exterior of the pipe lengths. Although it has been the practice to use a soft fill at the joint to smooth out the irregularity at that point while the coating is being applied, soft fills have been found unsatisfactory due to the fact that they yield, especially under circumstances where some sharp edge might be encountered, to the point where the multiple layers of coating break through.

Another factor chronically the cause of a poor coating job at the bell and spigot joint has resulted because of tendency of coating material to shrink after an application. Shrinking causes tensions and a thinning down of the coating thickness at the joint because of that being the area of greater stress. Frequently, although one layer such as an adhesive underlayer might not be greatly subject to shrinkage, an exteriorly wound coating of material of greater tensile strength as, for example, polyethylene, may be subject to considerable shrinkage, causing such a layer to thin down appreciably where it is drawn over a bell and spigot joint.

Further still, application of the successive layers of spirally applied coating material must be continuous, not only throughout the length of the pipe but also at the joint for the effective and economical application of coatings of this kind. Should, for example, it be necessary to stop progress of the jointed dual work product through the coating system, it is not feasible to halt extrusion of the coating material, such as butyl and polyethylene. A halt in the progress of coating can readily result in accumulation of huge piles of relatively expensive coating material on the floor, until the flow can be stopped, which is appreciably wasteful not only of material but of time consumed in the coating operation.

It is therefore among the objects of the invention to provide a new and improved coating system of multiple layers of coating extending over a bell and spigot or butt welded joint between adjacent pipe lengths of a dual jointed assembly wherein the physical integrity of the multiple layers of coating material is maintained throughout the exterior of the assembly.

Another object of the invention is to provide a new and improved pipe product consisting of pairs of pipe lengths with a permanent welded bell and spigot joint holding them together as an assembly wherein the assembly has a double layer of respective different kinds of coating material supported from beneath at the joint so that the assembly can be fabricated, handled, stored and shipped to the site without prospect of damage to the integrity of the coating under loads imposed during these operations.

Another object of the invention is to provide a new and improved pipe product assembly consisting of a pair of bell and spigot pipe lengths permanently welded at the joint, the pipe lengths being of the magnitude of 6 to 10 feet in diameter and some 80 feet in overall length, and wherein the assembly is completely encased in multiple layers of individually applied coating films which are of uniform thickness and character over the joint as well as throughout the remainder of the assembly.

Still another object of the invention is to provide a new and improved pipe product assembly and method of making said assembly wherein pipe lengths are initially connected with a welded bell and spigot joint exposing a relatively sharp annular corner, and then applying a bridge filler at the joint in a manner preventing coating layers subsequently applied in a spiral overlapping pattern from being weakend by the annular corner sufficient to impair the overall integrity of the coating layers.

Another object still is to provide a new and improved coating system of multiple layers of enveloping coating extending over the bell and spigot joint between adjacent pipe lengths of a pipe assembly wherein a special bridge filler is employed at the joint to effectively cushion the joint so that no weakness in the coating will be generated during the fabrication, handling or storage of the assembly.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

FIG. 1 is a side elevational view of a multiple unit steel pipe assembly.

FIG. 2 is an enlarged fragmentary longitudinal sectional view at the joint of the assembly of FIG. 1.

FIG. 3 is a cross-sectional view on the line 3—3 of FIG. 2.

FIG. 4 is a fragmentary longitudinal sectional view on the line 4—4 of FIG. 3 to a still larger scale.

FIG. 5 is a view similar to FIG. 4 after application of the filler bridge at the joint.

FIG. 6 is a view similar to FIGS. 4 and 5 after application of the first coating layer.

FIG. 7 is a fragmentary sectional view similar to FIGS. 4, 5 and 6, but after application of the second and final coating layer.

FIG. 8 is a perspective somewhat diagrammatic view showing a single assembly during its path of travel through the coating operation.

FIG. 9 is a fragmentary side elevational view showing the progression of application of the first and second coating strips.

FIG. 10 is a fragmentary cross-sectional view on the line 10—10 of FIG. 9.

FIG. 11 is a fragmentary sectional view similar to FIG. 7 but showing a modified application of the invention.

In an embodiment of the invention chosen for the purpose of illustration, there is shown in FIG. 1 a jointed multiple unit 10 consisting of pipe lengths 11 and 12, both of steel bell and spigot type, joined together with an overlapping type joint 13. Within the assembly there is a 360 degree sealing weld 14 at a spigot end 15 of the pipe length 12 where it adjoins the base 16 of a bell end 17 of the pipe length 11. Skip welds 18 are circumferentially spaced on the perimeter of the joint where the bell end 17 adjoins the exterior wall of the pipe length 12. This is a customary welded bell and spigot joint for steel pipe of this character which may range in size of four, six and eight feet or more in diameter with a usual length of forty feet each. The assembly, accordingly, is an eighty foot length of large diameter steel pipe with one weld at the middle. Customarily steel pipe of this character is made up of sheets of steel with single or multiple longitudinal welds 19 running from end to end of each length of pipe.

The pipe covering or coating films for pipe assemblies of the character here under consideration comprise two coating strips individually applied. A first coating strip 25 is customarily a sticky adhesive material such as butylmastic which is applied in a spiral overlapping strip or ribbon throughout the entire length of the assembly. Over the first coating strip is a second coating strip 26, preferably of synthetic plastic resin material such as polyethylene, likewise applied in a spiral partially overlapping manner.

Beneath the double layer of coating strips and precisely at the exposed end of the bell 17 which in part forms the joint 13, there is provided a filler bridge 27. The filler bridge is preferably solid and customarily consists of a natural or synthetic rubber-like material which is yieldable and capable of being depressed, but only to a degree. The filler bridge has one annular end wall 28 which is adapted to face and overlie a complementary annular end wall 29 of the bell end 17 of the joint. Of special significance is the fact that the height of the annular end wall 28 is somewhat greater than the height of the annular end wall 29 which is the thickness of the bell end 17 of the pipe length 11. Furthermore, the composition of the filler bridge 27 is made such that, taking into consideration the difference in height of the end walls just made reference to, there will be no circumstance under which an outer surface 30 of the filler bridge 27 will be depressed a distance sufficient to expose an annular corner 31 which the annular end wall 29 makes with the exterior surface of the bell end 17.

Although the skip welds 18 do not show in FIGS. 4 through 7, inclusive, it should be appreciated that the filler bridge material 27 may be provided with a chamfer 37 so that it can extend over all of the skip welds 18. It is also advantageous to have the filler bridge provided with an obliquely disposed surface 32 such that the thickness of the filler bridge diminishes progressively from a maximum thickness adjacent the outer surface 30 to a substantially feather edge 33 where the oblique surface joins the exterior surface of the length 12 of pipe.

In order to appreciate the structural accomplishment of the coating system described generally in connection with FIGS. 4 through 7, inclusive, it should be understood that for application of the coating strips, the assembly 10 is mounted on a conveyor 40 of substantially conventional construction and operation such that the entire assembly consisting of the two lengths 11 and 12 joined together at the joint 13 will move simultaneously in an endwise direction from left to right, as viewed in FIG. 8, while rotating in a counterclockwise direction as indicated by the arrow. There is provided an extrusion box 41 mounted as shown so that a longitudinally elongated outlet slot 42 is immediately adjacent the outside surface of the length 12 of pipe. Semi-liquid adhesive, fed through a supply line 43, is extruded from the outlet slot 42 onto the surface of the length 12 of pipe in a band 44 of appreciable width. The speed of travel lengthwise of the assembly 10 past the extrusion box, coupled with the rate of rotation, is such that there is an overlap of about one-half the width of the band for each 360-degree rotation of the assembly. The composition of the adhesive is further such that it becomes firm immediately following application of the exterior surface of the length 12 of pipe in order to have promptly applied over it a band 45 comprising the second overlying strip of polyethylene. The band 45 of polyethylene is extruded from a similar extrusion slot 46 of the extrusion box 47 which is fed by a supply line 48 for the polyethylene. Similarly the rate of endwise travel of the assembly and its rate of rotation is such that the band 45 of polyethylene can be applied over the band 44 of bitumen with only a short length of travel between them.

The filler bridge is preferably applied at a separate location before the assembly commences traveling and rotating to accomplish the application of the coating strips. The filler bridge 27 is applied in the form of a strip. The length of the filler bridge strip should be substantially the same as the outside circumference of the length 12 of pipe or slightly in excess so that upon completion of application of the filler bridge, one of ends 52 can be cut to abut the other. Although application of the filler strip as shown in FIG. 9 is adjacent the station for application of the bands 44 and 45, a preferable procedure is to complete application of the filler strip at an earlier stage where there will be no need to keep pace with travel along the conveyor.

Once the bands 44 and 45 have been applied successively over the filler bridge and the joint 13, the assembly continues to travel along the conveyor 40 until the entire length 11 of pipe is also covered.

In point of practice, it is frequently advisable to trim off a limited portion of the coating strip material to expose a breadth of the spigot end sufficient for it to enter the bell end and assembly next adjacent to it when the pipe is being laid in the field.

It also has been demonstrated that when the strip of polyethylene ultimately cools, there is some appreciable contraction causing the polyethylene to draw back away from the end and therefore obviate any need for trimming that particular coating strip. Furthermore, because of the filler bridge having been constructed in the manner described, namely, so as to be somewhat thicker than the wall thickness of the bell end of pipe at the joint, even though there be a considerable pressure exerted by a shrinkage of the polyethylene coating strip, the result will be no more than to depress the outer surface 30 only slightly, insufficient to expose the corner and, as a consequence, there will be no thinning down of either of the coating strips while they are being applied initially, or subsequently when the material of the strips takes a final set.

In FIG. 11 is shown a conventional butt weld to which the system can be applied. As there shown cylindrical pipe lengths 60 and 61 are brought together in abutting relationship. A band 62 is applied over adjacent abutting ends of the pipe lengths. To hold the band in place a weld 63 is made between one end 64 of the band 62 and the adjacent exterior of the cylindrical pipe length 60. There is a similar annular weld 65 between the opposite end 66 of the band 62 and the exterior of the cylindrical pipe length 61.

In this instance the same filler bridge 27 is made use of adjacent both welds 63 and 65 in the same manner as has been heretofore described. It is significant to note that the thickness of the filler bridge here also is made such that it is slightly thicker than the band 62 when initially applied. Application of the filler bridge is the same at both ends, made preferably at a station prior to placement of the lengths of pipe on the conveyor. That step having been accomplished, the successive coating strips 25 and 26 of respectively a material of bituminous character followed by a material of polyethylene character are applied in the same fashion as heretofore described.

Although application of the outer and inner bands 44 and 45 of coating strips is most advantageously accomplished at the factory, strips can be applied in the field. Under such circumstances tape, which may be pressure sensitive or otherwise adherent, may be applied in overlapping turns, from end to end of a double length of pipe. The tape is applied over the filler bridge 27 so as to hold it in place as do the bands 44 and 45 of the first described form of the invention.

While particular embodiments of the present invention have been shown and described, it will be obvious to those skilled in the art that changes and modifications may be made without departing from the invention in its broader aspects and, therefore, the aims of its appended claims are to cover all such changes and modifications as fall within the true spirit and scope of this invention.

Having described the invention, what is claimed as new in support of Letters Patent is as follows:

1. A seamless coating system for a multiple unit steel pipe assembly having an overlapping type joint between effective overlying and underlying ends of adjacent units wherein there is an annular sealing weld at the joint between the underlying end of one unit and the overlying end of the adjacent unit, an annular end wall on the overlying end, and an exterior annular corner at the exterior edge of said overlying end, said system comprising a first coating strip on said assembly extending throughout the length of both units and over said joint in spiral partially overlapping turns, a second coating strip overlying the first coating strip and extending throughout the length of the both units and over said joint in spiral partially overlapping turns, and an annular filler bridge at the joint between the exterior surface of the assembly and the interior surface of said first coating strip, said filler bridge comprising an elastomeric material in the recess formed by the annular end wall of said overlying end and the exterior surface of said one adjacent unit, said filler bridge having an initial thickness in excess of the thickness of said overlying end at said corner, said filler having a composition such that the outer surface of the filler bridge will not be depressed sufficiently to expose said annular corner under loads imposed during fabrication of said system and during handling, storage, and shipment of the system.

2. A seamless coating system as in claim 1 wherein the filler bridge is in the form of a strip of material extending around the corresponding underlying end of said one pipe unit with ends of the bridge in abutting relationship.

3. A seamless coating system as in claim 1 wherein the filler bridge has one relatively planar side in face to face engagement with the annular end wall, said filler bridge having a progressively diminishing thickness in a direction opposite from the planar side.

4. A seamless coating system as in claim 1 wherein said first coating strip is an endless spiral strip of adhesive material.

5. A seamless coating system as in claims 1 or 2 wherein said second strip is of synthetic plastic resin material.

6. A seamless coating system as in claim 2 wherein the first coating strip is an endless spiral strip of butylmastic material and the second coating strip is of polyethylene material.

7. A seamless coating system as in claim 1 wherein there are circumferentially spaced welds joining said pipe units and located in said recess and beneath said filler bridge.

8. A seamless coating system for a multiple unit steel pipe assembly having an overlapping type joint between effective overlying and underlying ends of adjacent units wherein there is an annular sealing weld between the underlying end of one unit and the overlying end of the other unit, an annular end wall on said overlying end, an exterior annular corner at the exterior edge of said overlying end and an annular recess between said annular corner and said underlying end, said system comprising a first coating layer on said assembly extending throughout the length of both units and over said joint, a second coating layer overlying the first coating layer and extending throughout the length of both units and over said joint, and an annular filler bridge at the joint between the exterior surface of the assembly and the interior surface of said first coating layer, said filler bridge comprising an elastomeric material in said recess, said filler bridge having an initial thickness in excess of the thickness of said overlying end at said corner, said filler having a composition such that the outer surface of the filler bridge will not be depressed sufficiently to expose said annular corner under loads imposed during fabrication of said system and during handling, storage, and shipment of the system.

9. A seamless coating system for a multiple unit steel pipe assembly having an overlapping type joint between overlying and underlying ends of adjacent units wherein there is an annular sealing weld at the joint between the underlying end of one unit and the overlying end of the other unit, an annular end wall on said overlying end, an exterior annular corner at the exterior edge of said overlying end and an annular recess between said annular corner and said underlying end, said system comprising layers of coating material on said assembly extending throughout the length of both units and over said joint, and an annular filler bridge at the joint and between the exterior surface of the assembly and the interior surface of said layers of coating material, said filler bridge comprising an elastomeric material in said recess, said filler bridge having an initial thickness in excess of the thickness of said overlying end at said corner, said filler having a composition such that the outer surface of the filler bridge will not be depressed sufficiently to expose said annular corner under loads imposed during fabrication of said system and during handling, storage, and shipment of the system.

10. A method for forming a seamless coating system on a multiple unit steel pipe assembly having an overlapping type joint therebetween comprising effective overlying and underlying ends of adjacent units and wherein there is an annular sealing weld between the overlying end of one unit and the underlying end of the other unit, an annular end wall on said overlying end, an exterior annular corner at the exterior edge of said overlying end and an annular recess between said annular corner and said underlying end, said method comprising applying a filler bridge of elastomeric material in strip form and of thickness in excess of the thickness of said overlying end to the exterior of the other of said units at said recess and abutting one end of said filler bridge against said annular end wall, said filler having a composition such that the outer surface of the filler bridge will not be depressed sufficiently to expose said annular corner under loads imposed during fabrication of said system and during handling, storage, and shipment of the system, continuously moving said assembly in an endwise direction past an extruding station and at the same time continuously rotating said assembly, first projecting an endless strip of adhesive material onto the exterior of a first of said units at said extruding station and simultaneously projecting an endless strip of synthetic plastic resin material onto the exterior surface of the adhesive material at said extruding station, projecting said adhesive material and said synthetic plastic resin material successively over said filler bridge as the filler bridge passes the extruding station, and then continuing projection of said adhesive material and said synthetic plastic resin material onto said other unit until said other unit is coated.

11. A method as in claim 10 including providing the filler bridge with a thickness diminishing progressively from the side abutting said annular end wall to a substantially feather edge at the opposite side.

* * * * *